United States Patent
Pniel

[11] Patent Number: 6,031,604
[45] Date of Patent: Feb. 29, 2000

[54] GUN-SIGHT DRY ZEROING ASSEMBLY

[75] Inventor: Zeev Pniel, Petach Tikva, Israel

[73] Assignee: International Technologies (Laser) Ltd., Rishon LeZion, Israel

[21] Appl. No.: 09/259,295

[22] Filed: Mar. 1, 1999

[51] Int. Cl.$^7$ .................................................. G01B 9/00
[52] U.S. Cl. ...................... 356/124; 356/124.5; 356/125; 356/128
[58] Field of Search ................................ 356/124, 124.5, 356/125, 126, 127, 128, 121

[56] References Cited

U.S. PATENT DOCUMENTS 5,112,125  5/1992  Neuman ..................................... 356/73

FOREIGN PATENT DOCUMENTS 74840  5/1992  Israel.

*Primary Examiner*—Frank G. Font
*Assistant Examiner*—Roy M. Punnose
*Attorney, Agent, or Firm*—Mark M. Friedman

[57] ABSTRACT

A dry zeroing assembly is provided for zeroing a gun-sight implemented on a gun having a barrel. The dry zeroing assembly includes (a) a housing defining a first optical path and a second optical path, the first optical path being for zeroing a laser pointer and the second optical path being for zeroing an eye gun-sight; (b) an objective lens assembly being engaged by the housing; (c) a beam splitter being engaged by the housing, the beam splitter being for directing a laser beam of the laser pointer arriving through the objective lens assembly to the first optical axis; (d) a filter being engaged by the housing in the first optical path, the filter allowing passage of a wavelength corresponding to a wavelength of a laser beam of the laser pointer; (e) a first light diffuser screen including a first reticle, the first light diffuser screen being engaged by the housing in the first optical path; (f) an eye piece assembly being engaged by the housing in the first optical path; (g) a second light diffuser screen including a second reticle, the second light diffuser screen being engaged by the housing in the second optical path, the housing being formed with an opening for allowing surrounding light to enter the second optical path for lighting the second reticle, the beam splitter further being for directing light from the second reticle, along the second optical path and through the objective lens assembly out of the housing; such that (i) when the first optical path parallels the barrel and further when the laser beam is fired from the laser pointer and enters the zeroing assembly via the objective lens assembly the laser beam focuses on the first light diffuser screen to form a laser spot thereon, so as to allow a user to adjust the position of the laser pointer, so as to align the laser beam with the barrel, by zeroing the laser spot with respect to the first reticle; and further such that (ii) when the second optical path parallels the barrel and further when the second reticle is viewed via the eye gun-sight, the eye gun-sight is zeroable with respect to the second reticle, to thereby ascertain that the eye gun-sight is zeroed.

14 Claims, 2 Drawing Sheets

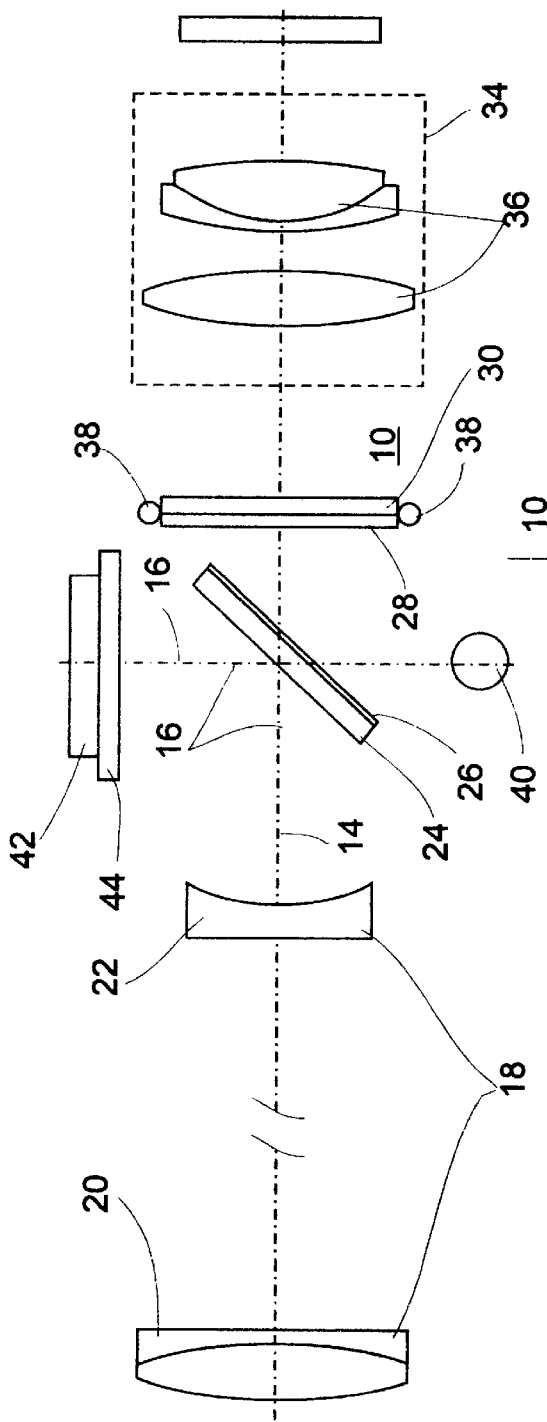
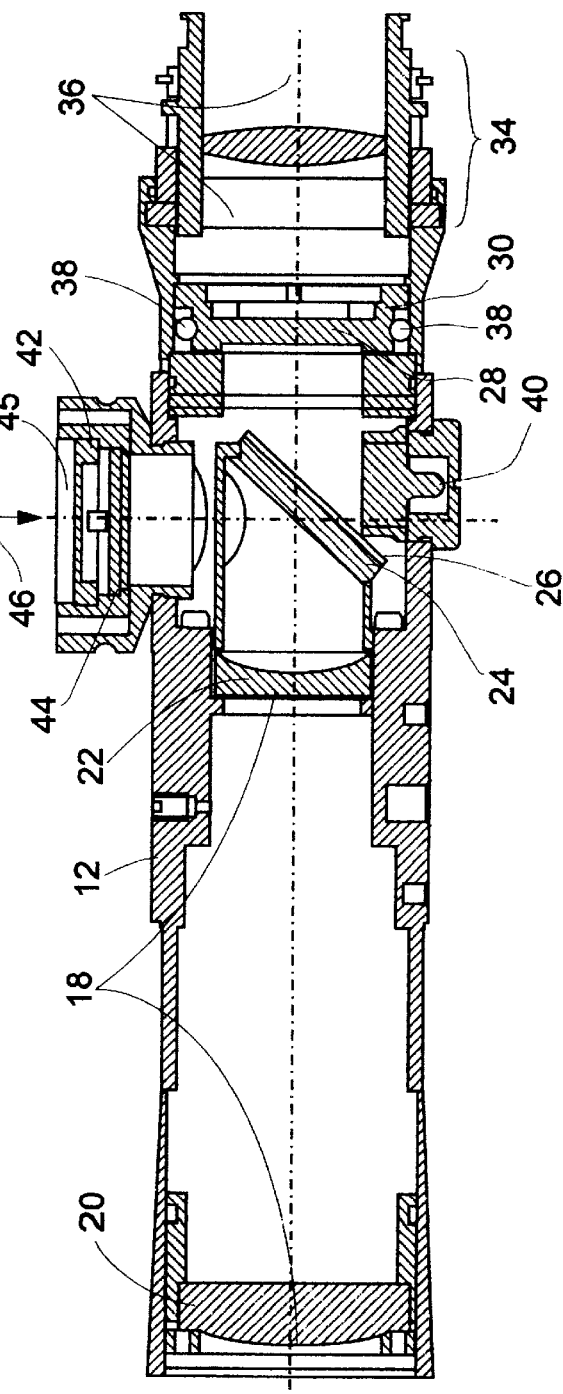

GUN-SIGHT DRY ZEROING ASSEMBLY

FIELD AND BACKGROUND OF THE INVENTION

The present invention relates to a gun-sight dry zeroing assembly and, more particularly, to a gun-sight dry zeroing assembly which is power source independent and which is suitable for dry zeroing of both eye (i.e., "in eye optical axis") gun-sights and laser pointers.

Gun-sights can be broken into eye gun-sights and laser pointers. Eye gun-sights, such as, but not limited to, iron gun-sights, telescopic, day and night, gun-sights and reflex gun-sights are characterized in that the user aligns the gun's barrel with the target by viewing the target through the eye gun-sight. As such, eye gun-sights can be referred to as "in eye optical axis" gun-sights. On the other hand, laser pointers are positioned not in the eye's optical axis.

Except for iron gun-sights, most gun-sights, including telescopic day and night gun-sights, reflex gun-sights and laser pointers are add-on components, and as such need to undergo installation, replacement and/or periodic zeroing.

Gun-sight zeroing approaches can be broken into live gun-sight zeroing and gun-sight dry zeroing. Live gun-sight zeroing involves actual firing and correction of offsets by adjustments made in the position of the gun-sight with respect to the gun's barrel. Live gun-sight zeroing is considered limiting because it requires (i) a firing zone; and (ii) light conditions which match the properties of the gun-sight being zeroed. Thus, day operated gun-sights cannot be zeroed during night time and vice versa.

Various gun-sight dry zeroing assemblies are known.

One such gun-sight dry zeroing assembly includes a spud which tightly fits into the gun's barrel and further includes a laser source (visible or infrared) connected at the far end of the spud. The laser source produces a narrow laser beam which is aligned with the spud. Zeroing is effected by aligning the laser beam with the gun-sight, which in this case can be either an eye gun-sight or a laser pointer. In the former case, the laser beam is pointed at a remote target to form a laser spot thereon and the user aligns the eye gun-sight such that a reticle thereof is zeroed with the laser spot. In the latter case the laser beam of the zeroing assembly forms a first laser spot on the remote target, whereas the laser pointer forms a second spot thereon, whereas the offset between the spots is used for zeroing. The limitations associated with this gun-sight dry zeroing assembly are (i) the requirement for a power source to operate the zeroing laser; (ii) the need for a range, i.e., zeroing has to be performed in the field; and (iii) the need for lighting conditions which will allow viewing the laser spot or spots.

Another zeroing assembly overcomes some of the above limitations however, it is not applicable for zeroing laser pointers. This assembly includes a spud and a collimative lens assembly connected parallel thereto and including a reticle. For zeroing, the user views the reticle through the eye gun-sight and performs the necessary zeroing as determined by the offset of the reticle.

IL Pat. No. 74840 entitled "OPTIC CALIBRATOR FOR LASER AIMER" teaches a zeroing assembly operable with laser pointers. It includes a spud, an objective lens connected thereto and including a reticle. A night vision tube (i.e., image converter) to convert the laser infrared light to visible light and an eye piece are connected to one end of the objective lens. Operating the laser pointer results in focusing of a laser spot on the reticle plane, which spot is viewed via the eye piece on the night vision tube screen to thereby enable zeroing. The limitations of this assembly are that it requires a power source to operate the night vision tube; that night vision tubes are cost-ineffective; and that eye gun-sights cannot be zeroed using this assembly.

There is thus a widely recognized need for, and it would be highly advantageous to have, a dry zeroing assembly which operates with all gun-sights, either eye gun-sights or laser pointers and which is devoid of the above limitations associated with the prior art gun-sight dry zeroing assemblies.

SUMMARY OF THE INVENTION

According to one aspect of the present invention there is provided a dry zeroing assembly for zeroing a laser pointer implemented on a gun having a barrel, the dry zeroing assembly comprising (a) a housing defining an optical path; (b) an objective lens assembly being engaged by the housing; (c) a filter being engaged by the housing, the filter allowing passage of a wavelength corresponding to a wavelength of a laser beam of the laser pointer; (d) a light diffuser screen including a reticle, the light diffuser screen being engaged by the housing; and (e) an eye piece assembly being engaged by the housing; such that when the optical path parallels the barrel and further when the laser beam is fired from the laser pointer and enters the zeroing assembly via the objective lens assembly the laser beam focuses on the light diffuser screen to form a laser spot thereon, so as to allow a user to adjust the position of the laser pointer, so as to align the laser beam with the barrel, by zeroing the laser spot with respect to the reticle.

According to another aspect of the present invention there is provided a dry zeroing assembly for zeroing a gun-sight implemented on a gun having a barrel, the dry zeroing assembly comprising (a) a housing defining a first optical path and a second optical path, the first optical path being for zeroing a laser pointer and the second optical path being for zeroing an eye gun-sight; (b) an objective lens assembly, which serves also as a collimator, being engaged by the housing; (c) a beam splitter being engaged by the housing, the beam splitter being for directing a laser beam of the laser pointer arriving through the objective lens assembly to the first optical axis; (d) a filter being engaged by the housing in the first optical path, the filter allowing passage of a wavelength corresponding to a wavelength of a laser beam of the laser pointer; (e) a first light diffuser screen including a first reticle, the first light diffuser screen being engaged by the housing in the first optical path; (f) an eye piece assembly being engaged by the housing in the first optical path; (g) a second light diffuser screen including a second reticle, the second light diffuser screen being engaged by the housing in the second optical path, the housing being formed with an opening for allowing surrounding light to enter the second optical path for lighting the second reticle, the beam splitter further being for directing light from the second reticle, along the second optical path and through the objective lens assembly out of the housing; such that (i) when the first optical path parallels the barrel and further when the laser beam is fired from the laser pointer and enters the zeroing assembly via the objective lens assembly the laser beam focuses on the first light diffuser screen to form a laser spot thereon, so as to allow a user to adjust the position of the laser pointer, so as to align the laser beam with the barrel, by zeroing the laser spot with respect to the first reticle; and further such that (ii) when the second optical path parallels the barrel and further when the second reticle is viewed via the eye gun-sight, the eye gun-sight is zeroable with respect to the second reticle, to thereby ascertain that the eye gun site is zeroed.

According to further features in preferred embodiments of the invention described below, the wavelength is in the visible range.

According to still further features in the described preferred embodiments the wavelength is red.

According to still further features in the described preferred embodiments the laser pointer emits infrared light, and the filter passes infrared light, the zeroing assembly further comprising a luminescencing substance for lighting the reticle.

According to still further features in the described preferred embodiments the luminescencing substance is green phosphorous.

According to still further features in the described preferred embodiments the luminescencing substance is activated by a radioactive substance.

According to still further features in the described preferred embodiments the beam splitter and the filter are integrated into a single optical component.

According to still further features in the described preferred embodiments the objective lens assembly includes a positive lens and a negative lens.

The present invention successfully addresses the shortcomings of the presently known configurations by providing a dry zeroing assembly which is power source and lighting conditions independent, which does not require a firing range for operation and which is operable with eye gun sites as well as with laser pointers.

BRIEF DESCRIPTION OF THE DRAWINGS

The invention herein described, by way of example only, with reference to the accompanying drawings, wherein:

FIG. 1 is a schematic depiction of the optical components of the dry zeroing assembly according to the present invention;

FIG. 2 is a cross sectional view of the dry zeroing assembly according to the present invention;

DESCRIPTION OF THE PREFERRED EMBODIMENTS

Figure 3:
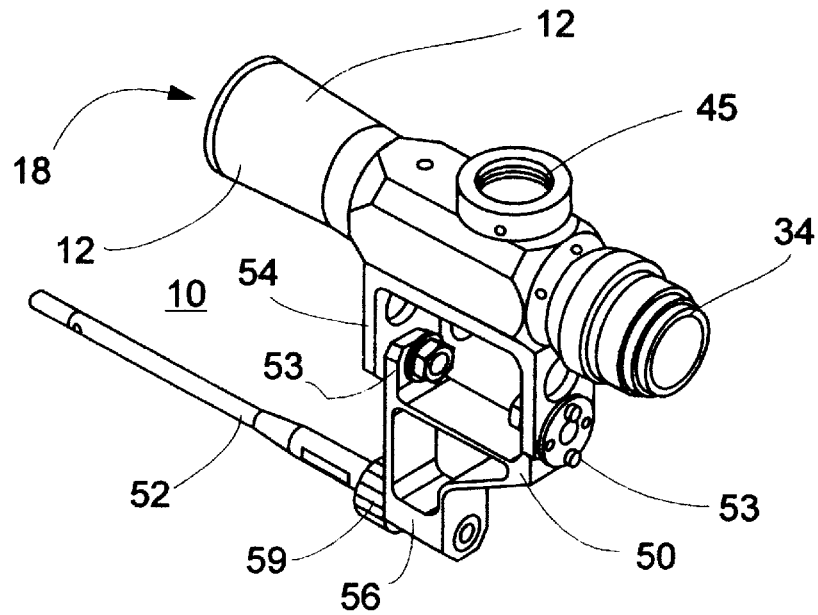
FIG. 3 is a perspective view of the dry zeroing assembly according to the present invention.

The present invention is of a gun-sight dry zeroing assembly which can be used for dry zeroing a variety of gun-sights. Specifically, the present invention can be used to for dry zeroing eye gun-sights, as well as laser pointers. The gun-sight dry zeroing assembly of the present invention is power source-independent.

The principles and operation of a dry zeroing assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates the optical arrangement of a gun-sight dry zeroing assembly according to the present invention, which is referred to herein below as gun-sight dry zeroing assembly 10, whereas FIG. 2 illustrated a cross sectional view thereof.

Gun-sight dry zeroing assembly 10 according to the present invention can be used for zeroing a gun-sight implemented on a gun having a barrel. Dry zeroing assembly 10 includes a housing 12 (FIG. 2). Housing 12 defines a first optical path 14 and a second optical path 16. As further detailed hereinunder, optical path 14 serves for zeroing a laser pointer, whereas optical path 16 serves for zeroing an eye gun-sight. Optical paths 14 and 16 according to the present invention share an objective lens assembly 18 which is engaged by housing 12. According to a preferred embodiment of the present invention, objective lens assembly 18 includes two lenses: a positive lens 20 and a negative lens 22 and also serves as a collimator. The use of such a telephoto lenses configuration is presently advantageous because it reduces the total mechanical length of assembly 18.

A beam splitter 24, which is engaged by housing 12 serves for forming optical paths 14 and 16 as further detailed hereinunder. It will be appreciated that if only a single optical path is provided, than beam splitter 24 is redundant and is preferably discarded.

We turn now to description of first optical path 14 which, as already pointed out, serves for zeroing of laser pointers. Thus, beam splitter 24 serves, in this respect, for directing a laser beam of the laser pointer arriving through objective lens assembly 18 to first optical path 14. A filter 26 which is engaged by housing 12 in first optical path 14 and which allows passage of a wavelength corresponding to the wavelength of the laser beam of the laser pointer is used to substantially block all other wavelengths, so as to allow, for example, zeroing of an infrared laser pointer during day time, as further detailed hereinunder.

A first light diffuser screen 28 which includes a first reticle 30 is engaged by housing 12 in first optical path 14, as well as an eye piece assembly 34, which may include one or several lenses 36.

When first optical path 14 parallels the barrel of the gun (e.g., by a spud which is further described hereinunder) and further when the laser beam is fired from the laser pointer and enters zeroing assembly 10 via objective lens assembly 18, the laser beam focuses on first light diffuser screen 28 to form a laser spot thereon, so as to allow a user to adjust the position of the laser pointer, so as to align the laser beam with the barrel by zeroing the laser spot with respect to first reticle 30.

In some cases laser pointers emit light in the visible range, e.g., red light (635–670 nm). In these cases, the wavelength which passes through filter 26 is in the visible range, e.g., red. The filter employed in this case serves to attenuate the intensity of laser light that projected to the eye, so as to allow good contrast between the laser point and the background. Some light of the visible range can however be permitted through filter 26, so as to allow the user to view reticle 30.

In other cases, however, the laser pointer emits infrared light, typically at 830±20 nm which is the range perceived by night goggles. In these cases the filter passes infrared light and blocks light outside this range. It is known that the human eye perceives infrared light of the above specified spectral range as red when the light is condensed to a small spot of relatively high density and when the background light is low. In this respect the reader is referred to Electro-Optics Handbook, by BUREL Industries Inc. Lancaster, Pa., U.S.A, section 5, which is incorporated herein by reference.

It is important to block visible light in this case, so as to enable to perceive the infrared laser spot. It will, however, be appreciated that some background light is required to view reticle 30. In order to precisely control the level of background light, zeroing assembly 10 preferably includes a luminescencing substance. According to one embodiment of the present invention the luminescencing substance is green phosphorous, which luminescence green light when activated. Activation of luminescence that lasts for several minutes can be effected by brief exposure to the surrounding light, however, in order not do be dependent on lighting conditions, activation of luminescence is preferably effected by a radioactive substance. The radioactive substance selected emits β radiation, one example is a substance incorporating tritium atoms. There are several alternatives for lighting reticle 30. According to one alternative, reticle 30 itself is made to luminescence and is printed on or embedded within diffuser 28. According to another alternative, reticle 30 is etched onto diffuser 28, wherein β-light sources 38 surrounding the edges of diffuser 28 emit green light which undergoes internal reflection within diffuser 28, yet escapes and is made visible through eye piece assembly 34 at the etched reticle marks. According to yet another alternative, a β-light source 40 is positioned with respect to beam splitter 24 so as to illuminate reticle 30. In the later case, filter 26 is selected to be a dichroic filter which also allows passage of light in a wavelength compatible with the luminescence emitted.

We turn now to a description of second optical path 16 which, as already pointed out, serves for zeroing eye gun sites. Second optical path 16 includes a second light diffuser screen 42 including a second reticle 44. Second light diffuser screen 42 is engaged by housing 12 in second optical path 16. Housing 12 is formed with an opening 45 for allowing surrounding light, as indicated by arrow 46, to enter second optical path 16. That light is used for lighting second reticle 44. It will be appreciated that beam splitter 24 serves in this respect for directing light from second reticle 44, along second optical path 16 and through objective lens assembly 18 out of housing 12. Second optical path 16 is arranged such that when second optical path 16 parallels the barrel and further when second reticle 44 is viewed via the eye gun-sight, then the eye gun-sight is zeroable with respect to second reticle 44 by adjusting the position of the eye gun-sight with respect to the barrel, to thereby ascertain that the eye gun-sight is zeroed. If a day eye gun-sight is to be zeroed, then zeroing can be effected either during day time or while using artificial lighting. If a night eye gun-sight is to be zeroed, then zeroing can be effected either during night time or while using an optical density filter cover or a training cap covering the optics of the night eye gun sight, as well known in the art.

According to a preferred embodiment of the present invention beam splitter 24 and filter 26 are integrated into a single optical component.

It will be appreciated by one ordinarily skilled in the art that the positions of optical paths 14 and 16 can be exchanged to otherwise function in a fashion similar to as described herein. Therefore, when the phrase "optical path parallels the barrel" is used herein in the specification and in the claims section below, it indicates that the portion of the indicated path (first or second) represented by objective lens assembly 18 actually parallels the barrel, whereas other portions of the indicated path either co-align with the portion of the path represented by objective lens assembly 18, as is the case for path 14 in the example given, or alternatively, other portions of the path split (e.g., at 90°) from the portion of the path represented by objective lens assembly 18, as is the case for path 16 in the example given.

The optical arrangement of the gun-sight dry zeroing assembly according to the present invention has numerous advantages over the prior art: (i) it is applicable for all gun-sights, both eye gun-sights and laser pointers; (ii) it is power source-independent; (iii) it does not require a firing range for operation; and (iv) it is operable with both day and night operated gun-sights regardless of external lighting conditions.

Figures 4A, 4B:
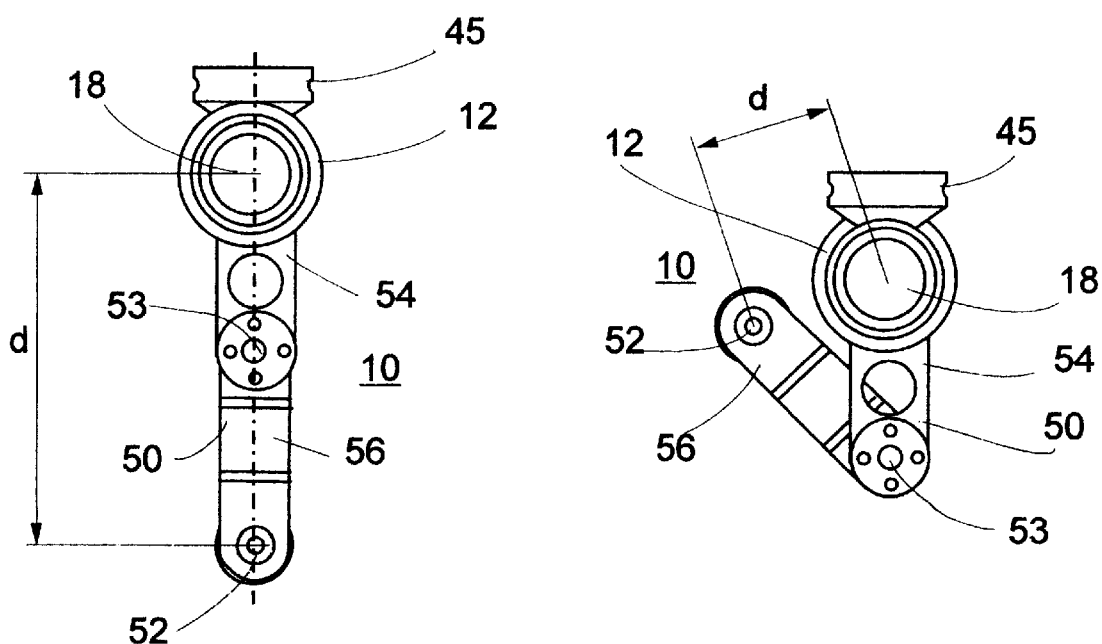
FIGS. 4a–b are frontal views of the dry zeroing assembly according to the present invention, in erected and collapsed positions, respectively.

FIGS. 3–4b show some mechanical features of assembly 10 according to the present invention, rendering assembly 10 suitable for zeroing all gun-sights. Marked at 12 is the housing; marked at 45 is the opening for directing surrounding light into the second optical path; marked at 34 is the eyepiece assembly of the first optical path; whereas marked at 18 is the objective lens assembly.

Thus, gun-sight dry zeroing assembly 10 includes a mount 50 for mounting assembly 10 onto the barrel. Mount 50 includes an interchangeable spud or rod 52 which is insertable into the barrel and is tightly accommodated therein. Mount 50 is so designed and connected to housing 12 such that when rod 52 is inserted into the barrel, the optical paths of assembly 10 parallel the barrel. Mount 50 is further designed so as to allow co-alignment of assembly 10 with a gun-sight attached to the gun. It will be appreciated that different gun-sights are positioned at different locations. While eye gun-sights are traditionally located above the barrel, laser pointers are located underneath the barrel, so as to enable the use of both an eye gun-sight and a laser pointer. Thus, mount 50 is designed to have a hinge 53 for rotatably connecting rotatable parts 54 and 56 thereof As best seen in FIGS. 4a–b, by collapsing and erecting rotatable parts 54 and 56 with respect to one another, one can control the distance "d" between housing 12 and spud 52. A second rotation is effected by rotating spud 52 within the barrel, so as to enable the positioning of mount 50 at any location within a wide circular band surrounding spud 52. The spud can be changed according to the barrel size by using a fastening nut 59.

Calculations for eye safety which define the maximal allowed direct exposure to laser light viewed through the eye piece of the dry zeroing assembly according to the present invention, can readily be performed by one ordinarily skilled in the art, in accordance with, for example, the European standard for safety of laser products EN 60825-1, taking into consideration the eye aperture, the time of exposure, the laser power, and the system's overall transmission.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A dry zeroing assembly for zeroing a laser pointer implemented on a gun having a barrel, the dry zeroing assembly comprising:
   (a) a housing defining an optical path;
   (b) an objective lens assembly being engaged by said housing;
   (c) a filter being engaged by said housing, said filter allowing passage of a wavelength corresponding to a wavelength of a laser beam of the laser pointer;
   (d) a light diffuser screen including a reticle, said light diffuser screen being engaged by said housing; and (e) an eye piece assembly being engaged by said housing; such that when said optical path parallels the barrel and further when said laser beam is fired from said laser pointer and enters the zeroing assembly via said objective lens assembly said laser beam focuses on said light diffuser screen to form a laser spot thereon, so as to allow a user to adjust the position of the laser pointer, so as to align the laser beam with the barrel, by zeroing the laser spot with respect to said reticle.

2. The dry zeroing assembly of claim 1, wherein said wavelength is in the visible range.

3. The dry zeroing assembly of claim 2, wherein said wavelength is red.

4. The dry zeroing assembly of claim 1, wherein said laser pointer emits infrared light, and said filter passes infrared light, the zeroing assembly further comprising a luminescencing substance for lighting said reticle.

5. The dry zeroing assembly of claim 4, wherein said luminescencing substance is green phosphorous.

6. The dry zeroing assembly of claim 4, wherein said luminescencing substance is activated by a radioactive substance.

7. A dry zeroing assembly for zeroing a gun-sight implemented on a gun having a barrel, the dry zeroing assembly comprising:

(a) a housing defining a first optical path and a second optical path, said first optical path being for zeroing a laser pointer and said second optical path being for zeroing an eye gun-sight;

(b) an objective lens assembly being engaged by said housing;

(c) a beam splitter being engaged by said housing, said beam splitter being for directing a laser beam of said laser pointer arriving through said objective lens assembly to said first optical axis;

(d) a filter being engaged by said housing in said first optical path, said filter allowing passage of a wavelength corresponding to a wavelength of a laser beam of the laser pointer;

(e) a first light diffuser screen including a first reticle, said first light diffuser screen being engaged by said housing in said first optical path;

(f) an eye piece assembly being engaged by said housing in said first optical path;

(g) a second light diffuser screen including a second reticle, said second light diffuser screen being engaged by said housing in said second optical path, said housing being formed with an opening for allowing surrounding light to enter said second optical path for lighting said second reticle, said beam splitter further being for directing light from said second reticle, along said second optical path and through said objective lens assembly out of said housing; such that:

(i) when said first optical path parallels the barrel and further when said laser beam is fired from said laser pointer and enters the zeroing assembly via said objective lens assembly said laser beam focuses on said first light diffuser screen to form a laser spot thereon, so as to allow a user to adjust the position of the laser pointer, so as to align the laser beam with the barrel, by zeroing the laser spot with respect to said first reticle; and further such that:

(ii) when said second optical path parallels the barrel and further when said second reticle is viewed via said eye gun-sight, the eye gun-sight is zeroable with respect to the second reticle, to thereby ascertain that the eye gun-sight is zeroed.

8. The dry zeroing assembly of claim 7, wherein said wavelength is in the visible range.

9. The dry zeroing assembly of claim 8, wherein said wavelength is red.

10. The dry zeroing assembly of claim 7, wherein said laser pointer emits infrared light, and said filter passes infrared light, the zeroing assembly further comprising a luminescencing substance for lighting said reticle.

11. The dry zeroing assembly of claim 10, wherein said luminescencing substance is green phosphorous.

12. The dry zeroing assembly of claim 10, wherein said luminescencing substance is activated by a radioactive substance.

13. The dry zeroing assembly of claim 7, wherein said beam splitter and said filter are integrated into a single optical component.

14. The dry zeroing assembly of claim 7, wherein said objective lens assembly includes a positive lens and a negative lens.

* * * * *